United States Patent
Kunisch

(10) Patent No.: US 6,298,124 B1
(45) Date of Patent: Oct. 2, 2001

(54) METHOD FOR TRANSMITTING DATA SIGNALS ON ANALOG SUBSCRIBER LINES

(75) Inventor: Paul Kunisch, Puchheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/153,907

(22) Filed: Sep. 16, 1998

(51) Int. Cl.[7] .............................. H04M 15/00; H04J 3/12
(52) U.S. Cl. ............. 379/114.01; 379/122; 379/144.08; 370/494
(58) Field of Search ....................... 379/111, 112, 379/113, 114, 115, 116, 118, 120, 121, 130, 143, 144, 122; 370/493, 494, 495, 528

(56) References Cited

U.S. PATENT DOCUMENTS

| | | | |
|---|---|---|---|
| 4,670,874 | * 6/1987 | Sato et al. ............................ | 379/494 |
| 5,303,297 | * 4/1994 | Hillis ................................... | 379/114 |
| 5,506,893 | * 4/1996 | Buscher et al. ...................... | 379/114 |
| 5,608,788 | * 3/1997 | Demlow et al. ..................... | 379/142 |
| 5,822,411 | * 10/1998 | Swale et al. ......................... | 379/111 |
| 5,909,445 | * 6/1999 | Schneider ............................ | 370/468 |
| 6,002,755 | * 12/1999 | Krank et al. ......................... | 379/130 |

* cited by examiner

Primary Examiner—Binh K. Tieu
(74) Attorney, Agent, or Firm—Bell Boyd & Lloyd LLC

(57) ABSTRACT

A method for transmitting data signals on analog subscriber lines wherein bilateral data transmission between subscriber terminal equipment and exchange is intended to occur, with relative ease and with low outlay, even during speech signal transmission. A signal, preferably the charge pulse signal, that is already generated at least in the exchange for some other use is employed as a carrier signal wherein, accordingly, it is possible to exploit an already existing infrastructure.

3 Claims, 1 Drawing Sheet

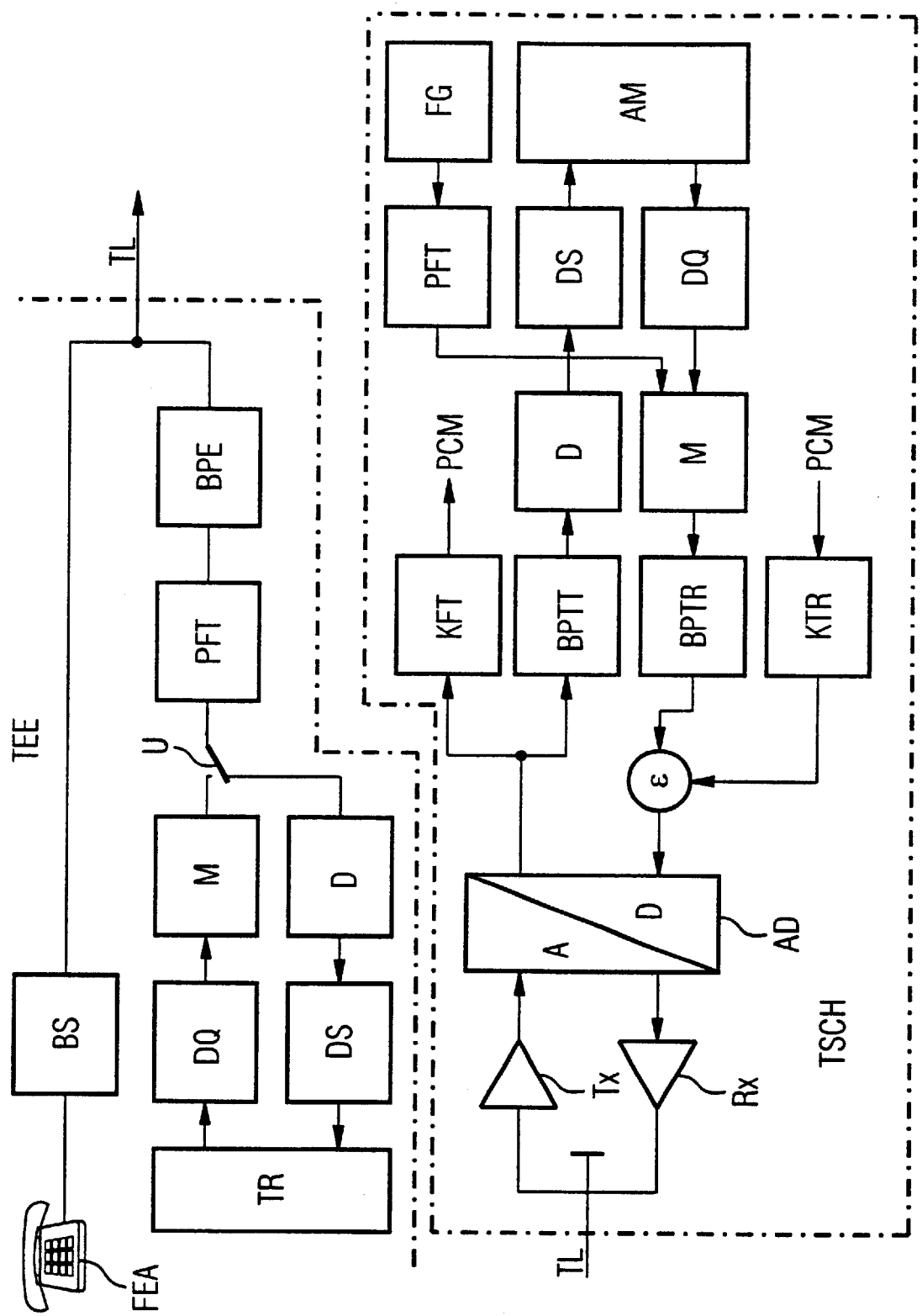

METHOD FOR TRANSMITTING DATA SIGNALS ON ANALOG SUBSCRIBER LINES

BACKGROUND OF THE INVENTION

1. Field of the Invention

The present invention relates to a method for transmitting data signals on analog subscriber lines between subscriber terminal equipment and a telephone exchange, preferably during the speech signal transmission of an existing telephone connection.

2. Description of the Prior Art

A variety of different methods are applied for transmitting data on analog subscriber lines that primarily serve the speech signal transmission between a piece of telephone terminal equipment and the telephone exchange. Among them is a DC signalization wherein the data signal transmission occurs by means of sequences of loop interruptions and a loop signalization that is balanced, or imbalanced, to ground is provided. An AC signalization is also suitable wherein AC signals of 50 Hz are coupled onto the subscriber line loops in ground-imbalanced fashion. Another type of data transmission is what is known as DTMF signalization (multi-frequency code signalization), wherein the signaling information is formed by means of an m out of n coding of n tone frequency signals. Finally, there are what are known as modem transmissions, for which the binary data signals are converted into technically advantageous line signals which correspond to the electrical conditions of analog connections; i.e., frequency modulation, phase difference modulation and quadrature amplitude modulation being essentially suitable for this purpose. The DC signalization is disadvantageous since it disturbs the speech transmission. The AC signalization is extremely slow and thus suitable only for certain types of data transmissions. The two latter methods for data exchange use the speech frequency range and are thus unsuitable for a simultaneous transmission of data and speech. However, there is a need for this, particularly in connection with functions offered by modem convenience subscriber terminal equipments.

It is thus an object of the present invention to propose a method for the transmission of data signals on analog subscriber lines wherein such transmission can also occur during the speech signal transmission and can be implemented with relatively low outlay.

SUMMARY OF THE INVENTION

Such object is achieved in a method of transmission wherein data signals are modulated in both the subscriber circuit of a telephone exchange and in the subscriber terminal equipment onto a signal with periodic characteristics serving as a carrier signal which has a frequency lying outside the speech band and which is already generated at least in the telephone exchange for some other use. The inventive method can thus make use of an infrastructure that is already present.

According to an embodiment of the present invention, as a signal generated for some other use, a signal transmitted from the telephone exchange to the subscriber for purposes of charge display or charge debiting at the subscriber is applied as a carrier signal for the inventive data transmission.

In order to be able to use the inventive method, there is no special outlay necessary in a telephone exchange wherein a generation and transmission of such charge signals is already provided.

The inventive method opens the possibility of offering new performance features. Thus, according to an embodiment of the present invention, information can be transmitted as data signals during the speech signal transmission which serves the authentication of the subscriber terminal equipment and offers a more extensive security against improper use of subscriber-specific facilities than methods wherein the authentication is carried out only in the course of the buildup of a telephone connection.

According to another embodiment of the present invention, the inventive method opens the possibility of specifying the charge display or the charge debiting at the subscriber, which is briefly discussed below.

Further developments of the present invention relate to appropriate circuit arrangements for carrying out the inventive method in both its general and specific form; namely, in connection with its use for subscriber authentication.

Additional features and advantages of the present invention are described in, and will be apparent from, the Detailed Description of the Preferred Embodiments and the Drawings.

DESCRIPTION OF THE DRAWINGS

FIG. 1 depicts parts of a subscriber terminal equipment TEE as well as a subscriber circuit TSCH which belongs to this subscriber terminal equipment and which is part of a telephone exchange (not further detailed).

DETAILED DESCRIPTION OF THE PREFERRED EMBODIMENTS

The subscriber terminal equipment TEE is connected to the subscriber circuit TSCH via a subscriber line TL. The subscriber terminal equipment TEE contains telephone terminal FEA which transmits and receives analog speech signals; the aforementioned subscriber line therefore also being a matter of what is known as an analog subscriber line. Analog speech signals transmitted via the subscriber line from the telephone terminal to the subscriber circuit TSCH are converted into digital signals after passing through a transmitting amplifier Tx in a means AD for analog-digital conversion or, respectively, digital-analog conversion. The signals are then fed to the coupling field (not shown) of the telephone exchange via a PCM line PCM following a band limitation to 0 to 4 KHz by means of a channel filter KFT. Conversely, speech information arriving from there as digital signals undergoes a digital-analog conversion in the aforementioned means A/D after passing through the speech filter KTR and is transmitted to the telephone terminal FEA via the subscriber line TL after passing through the receiving amplifier Rx.

The remaining parts of the subscriber terminal equipment TEE and of the subscriber circuit TSCH shown here are connected to the data transmission corresponding to the inventive method.

In the subscriber circuit TSCH, a frequency generator FG should be mentioned first which, in the exemplary case, should be a matter of a generator for generating a sinusoidal signal with a frequency of 12 or 16 KHz which originally serves to be transmitted to the subscriber terminal in the form of charge pulses in order to effect either a charge display there, or, as in the case of a subscriber terminal in the form of a payphone terminal, a charge debiting, for example.

The signals generated by the frequency generator FG are inventively employed as carrier signals for data to be transmitted between telephone exchange and subscriber terminal. They first pass through a pulse formation step PFT, which is a matter of an integrator or a band-pass filter or the like, in order to prolong the transient response time or, respectively, decay time in the activation and deactivation of the generator such that these transitions do not lead to the occurrence of clicks in the subscriber terminal or, respectively, in the telephone terminal FEA thereof in reception. The carrier signals subsequently reach a modulator M to which the data intended to be transmitted to the subscriber terminal equipment TEE are fed by a means designated overall as data source DQ.

In the modulator M, the data is modulated onto the carrier signal delivered by the frequency generator FG. It then passes through a filter BPTR in the form of a band-pass, which assures that modulation products whose frequency lies in or near the speech band from 0 to 3.4 KHz are filtered out. A superposition with the speech information coming from the channel filter KTR occurs in a summing member S.

The subscriber terminal TEE contains corresponding components serving the data transmission directed to the subscriber circuit; namely, a frequency generator which is herein considered a component of a transmitter TR, a data source DQ, a modulator M, a pulse former PFT and a filter BPE in the form of a band-pass BPE.

As means in the subscriber terminal which are decisive for the receiving direction of the data transmission, the band-pass BPE should again be mentioned—this producing the effect that only data signals modulated onto the carrier frequency are fed to the data evaluation out of the mix of these signals and speech signals—as well as a demodulator D reachable via a conversion function U, a data sink DS and an evaluating circuit considered to be a component of the means TR. In the subscriber circuit TSCH at the receive side, the decisive means are a band-pass BPTT, a demodulator D, and a data sink DS, accordingly.

In the present case, it is assumed that the data to be transmitted between subscriber circuit and subscriber terminal is a matter of data connected to the subscriber authentication, for which reason the data source DQ and the data sink DS stand in connection with an authentication module AM in the subscriber circuit. Authentication data are delivered via these wherein the subscriber terminal has to react to the reception of this data in a defined manner by emitting response information which is then evaluated in the authentication module AM. Given the absence of such response functions, or given the reception of response functions that do not correspond to the expected form, an interruption of the telephone connection is prompted by the authentication module AM for which purpose data connections for switching control of the telephone exchange are used (not depicted).

Such an exchange of authentication information during speech signal transmission is particularly significant in connection with subscriber terminals in the form of payphones or in the form of terminals configured to pay telephone charges by debiting what is known as a pre-paid card. In such cases, it would be possible to conduct telephone calls without paying charges, namely by means of tapping a subscriber line from a telephone device that is authorized, per se, following the buildup of a connection.

The inventive data transmission can, of course, also occur outside a speech signal transmission; for example, for crediting the pre-paid card following a completed prepayment in the abovementioned case.

Another application of the inventive data transmission during speech signal transmission is the specification of the charge display or the charge debiting; i.e., the data contains information concerning the accrued charges which can be of interest if, in addition to conventional telephone connections, satellite connections are possible (which are extremely expensive in comparison) and the display or debiting spectrum consequently no longer can be covered with a conventional charge pulse transmission without further ado.

Although the present invention has been described with reference to specific embodiments, those of skill in the art will recognize that changes may be made thereto without departing from the spirit and scope of the invention as set forth in the hereafter appended claims.

I claim as my invention:

1. A method for transmitting data signals on analog subscriber lines between a subscriber terminal equipment and a telephone exchange, Preferably during speech signal transmission of an existing telephone connection, comprising the steps of:

providing a carrier signal generator in the telephone exchange;

providing a data source in the telephone exchange;

providing a modulator in the telephone exchange;

modulating the data signals in a subscriber circuit and in the subscriber terminal equipment onto a signal with perodic characteristics serving as a carrier signal that has a frequency iying outside a speech band and that is already generated at least in the telephone exchange for some other use, the data signals delivered by the data source being modulated onto the carrier signal delivered by the carrier signal generator;

filtering out modulation products falling in the speech signal range at a transmit side;

superimposing the modulated carrier signal and the speech signal;

filtering out the modulated carrier signal at a receive side;

connecting a demodulator downstream of the filtering step;

connecting a data evaluation circuit to the demodulator; and blocking the carrier signal frequency connected to the telephone terminal of the subscriber terminal equipment upstream with a filtering unit.

2. A method for transmitting data signals as claimed in claim 1, further comprising the steps of:

providing a pulse formation step to the carrier signal generator of the subscriber circuit downstream; and prolonging the transient response time and delay time of pulse edges arising in the activation and deactivation of the carrier frequency generator, so as to avoid clicks in the telephone terminal.

3. A method for transmitting data signals as claimed in claim 2, further comprising the steps of:

providing an authentication module preferably allocated to groups of subscriber circuits;

generating data serving for subscriber identification to be transmitted to the subscriber terminal equipment with the authentication module; and evaluating data received by subscriber terminal equipment in this connection and interrupting telephone connections potentially determined to be non-authenticated.

* * * * *